(12) United States Patent
Urban et al.

(10) Patent No.: US 8,268,390 B2
(45) Date of Patent: Sep. 18, 2012

(54) ADHESIVE FILM HAVING AT LEAST TWO CONTINUOUS PHASES

(75) Inventors: Dieter Urban, Speyer (DE); Petra Schoecker, Buerstadt (DE); Stefan Kirsch, Nieder-Olm (DE); Ines Pietsch, Speyer (DE); Michael Kutschera, Limburgerhof (DE); Horst Weiss, Neuhofen (DE); Cornelis Petrus Beyers, Altrip (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1112 days.

(21) Appl. No.: 11/771,439

(22) Filed: Jun. 29, 2007

(65) Prior Publication Data

US 2008/0124543 A1 May 29, 2008

Related U.S. Application Data

(60) Provisional application No. 60/817,361, filed on Jun. 30, 2006.

(30) Foreign Application Priority Data

Jun. 30, 2006 (EP) .................................... 06116465

(51) Int. Cl.
*C09J 7/00* (2006.01)
*C09J 7/02* (2006.01)

(52) U.S. Cl. ................ 427/208.4; 427/208.8; 427/333; 427/402; 427/407.1

(58) Field of Classification Search ............... 427/208.4, 427/208.8, 333, 402, 407.1
See application file for complete search history.

(56) References Cited

U.S. PATENT DOCUMENTS

| | | | |
|---|---|---|---|
| 5,356,993 A | 10/1994 | Erickson et al. | |
| 5,405,693 A | 4/1995 | Dittrich et al. | |
| 5,670,557 A * | 9/1997 | Dietz et al. ................... | 522/184 |
| 7,041,720 B2 | 5/2006 | Aydin et al. | |

FOREIGN PATENT DOCUMENTS

| | | |
|---|---|---|
| DE | 103 23 048 A1 | 12/2004 |
| EP | 0 625 557 A1 | 11/1994 |
| JP | 11256125 A * | 9/1999 |

OTHER PUBLICATIONS

S. Kirsch, et al. "Interface and bulk properties in films of phase separated dispersion particles", Progress in Organic Coatings 45 (2002), pp. 193-204.
U.S. Appl. No. 12/595,549, filed Oct. 12, 2009, Jesse, et al.
U.S. Appl. No. 12/937,668, filed Oct. 13, 2010, Gerst, et al.

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

An adhesive film which comprises at least two continuous polymer phases A and B each formed from a polymer or polymer mixture A (polymer A for short) and a polymer or polymer mixture B (polymer B for short) and which is obtainable by filming at least one of the polymers, A or B, initially in the form of an aqueous polymer dispersion.

9 Claims, 2 Drawing Sheets

C2

C1

ADHESIVE FILM HAVING AT LEAST TWO CONTINUOUS PHASES

BACKGROUND OF THE INVENTION

1. Field of the Invention

The present invention relates to an adhesive film which comprises at least two continuous polymer phases A and B each formed from a polymer or polymer mixture A (polymer A for short) and a polymer or polymer mixture B (polymer B for short) and which is obtainable by filming at least one of the polymers, A or B, initially in the form of an aqueous polymer dispersion.

2. Discussion of the Background

With pressure-sensitive adhesives (PSAs) there is a desire not only for effective adhesion to the substrate but also for a sufficient internal strength within the adhesive layer (cohesion). Adhesion and cohesion constitute divergent performance properties. Measures which bring about an improvement in the adhesion generally lead at the same time to a deterioration in the cohesion, and vice versa.

PSAs based on aqueous polymer dispersions which are obtainable by emulsion polymerization have been known for a long time. The polymers in such dispersions are, in particular, polyacrylates or vinyl acetate/ethylene copolymers. With emulsion polymers of this kind an improvement in the adhesion and the cohesion has to date been achieved by selection of appropriate comonomers or additives. By way of example, reference may be made to DE-A 103 23 048, whereby positive effects are achieved by adding silicon compounds to the polymer dispersion. EP-A 625 557 discloses PSAs which comprise hydroxyalkyl acrylates.

There is a desire for alternative methods of enhancing the adhesion and cohesion of PSAs. The methods ought to be extremely simple and the improvements in performance properties ought to be achieved in particular without necessarily having to use new or expensive raw materials.

Polymer films comprising at least two continuously intermixed polymer phases are known per se. Bicontinuous polymer phases are described for example by S. Kirsch, A. Pfau, E. Hädicke and J. Leuninger in Progress in Organic Coatings 45 (2002), 193-204.

U.S. Pat. No. 5,670,557 discloses PSA having a continuous polymer phase. The preparation process described in U.S. Pat. No. 5,670,557 uses aqueous microemulsions of monomers. The emulsified particles comprise the hydrophobic monomers; hydrophilic monomers are in solution in water. The microemulsion is coated onto the desired backing, and only after that is the polymerization carried out by irradiation with high-energy light directly on the backing.

The PSAs obtained are said to be suitable in particular for applications requiring electrical conductivity on the part of the PSA.

U.S. Pat. No. 5,356,993 describes the production of phase-separated adhesives, seals, and coatings by coating onto a suitable backing with subsequent irradiation. The system is composed of an epoxidized diene polymer and of a further epoxy polymer. Polymer dispersions are not mentioned.

SUMMARY OF THE INVENTION

Objects of the present invention were adhesive coatings having improved performance properties.

Found accordingly have been the adhesive films defined at the outset, especially PSA films. Also found have been self-adhesive articles comprising adhesive films or PSA films of this kind.

An essential feature of the invention is that the bicontinuous adhesive film is obtainable by filming at least one of the polymers, A or B, initially in the form of an aqueous polymer dispersion.

BRIEF DESCRIPTION OF THE DRAWINGS

The preferred embodiments of the invention will be described in detail, with reference to the following figures, where.

DETAILED DESCRIPTION OF PREFERRED EMBODIMENTS

The Bicontinuous Film Structure

Figure 1:
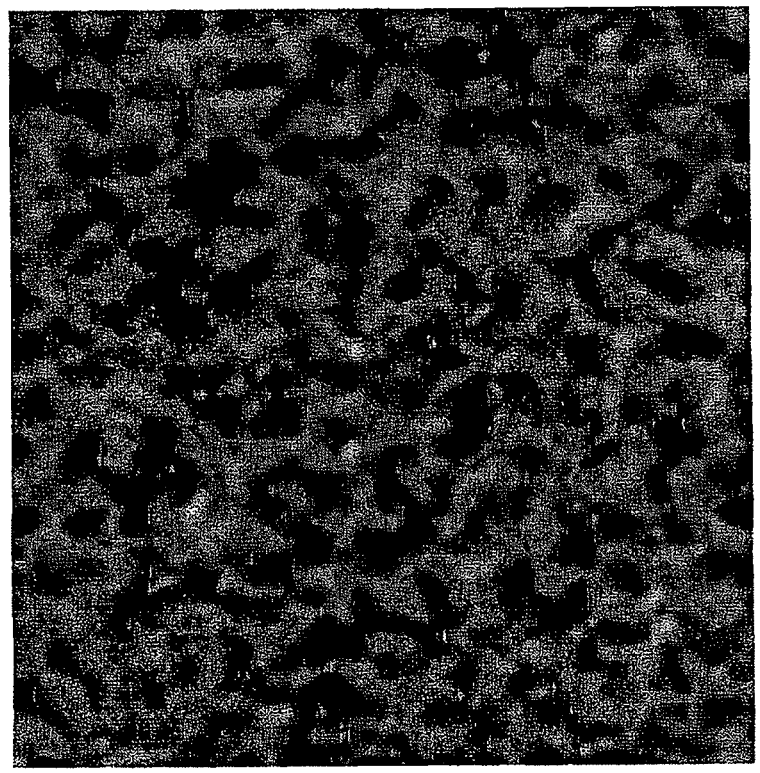
FIG. 1 shows atomic force microscopy images for polymer dispersions I1 and I2.
Figure 1:
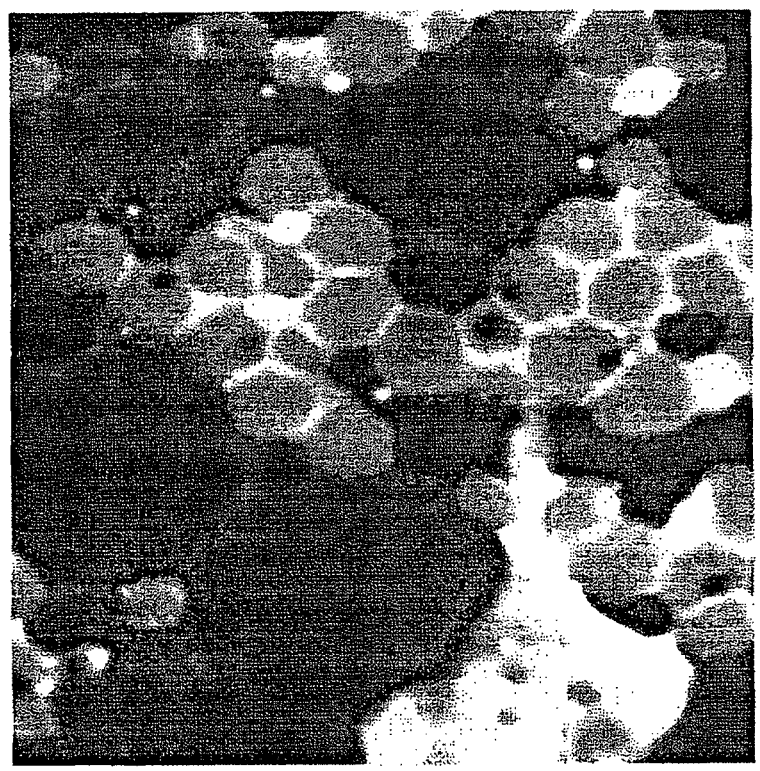

Two different polymer phases can form different structures in one polymer film. In each case the polymer of one phase is separate from that of the other phase by virtue of a phase boundary. For example, one polymer may form small, non-coherent particles (dispersed phase), which are distributed in the other polymer (matrix, continuous phase). Another possibility is for both polymers to form a continuous phase. In this case both polymers are distributed over the entire region under consideration in the manner of an "interpenetrating network"; neither of the polymers is present in the form of dispersely distributed particles in a matrix of the other polymer—in short: both polymers form a continuous phase, and the polymer film is termed bicontinuous.

For the purposes of the present invention it is sufficient if only part of the overall polymer film is bicontinuous. The ascertainment of the film structure is accomplished by evaluating high-resolution micrographs. The method of microscopy in this case must be chosen such that it is suitable for representing the two continuous phases separately and hence of distinguishing them. Particularly suitable methods are those of atomic force microscopy (AFM) and transmission electron microscopy (TEM). For the ascertainment of the film structure, the image extract of the individual micrographs ought to amount to from 10 to 20 times the average diameter of the dispersed polymer particles.

Preferably a micrograph of any cross section through the film ought to show at least 10% by area of structures of two continuous polymer phases; with particular preference a micrograph of this kind ought to show at least 30%, with very particular preference at least 50%, and in particular 70% by area of structures of two continuous polymer phases. In one particular embodiment of the present invention a micrograph of this kind shows 85% by area or is composed of 100% of structures of two continuous polymer phases.

The Chemical Composition of Polymers A and B

The statements below apply independently to both polymers, unless reference is made specifically to one polymer, A or B.

Suitable polymers include free-radically polymerized polymers, polyesters or polyadducts.

Preferred polymers are obtainable by addition polymerization of free-radically polymerizable compounds (monomers). Particular preference is given to polymers composed of at least 40%, more preferably at least 60%, and very preferably at least 80% by weight of what are called principal monomers.

The principal monomers are selected from $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and 1 or 2 double bonds, or mixtures of these monomers.

Examples include (meth)acrylic acid alkyl esters with a $C_1$-$C_{10}$ alkyl radical, such as methyl methacrylate, methylacrylate, n-butyl acrylate, ethyl acrylate, and 2-ethylhexyl acrylate.

Also suitable in particular are mixtures of the (meth)acrylic acid alkyl esters.

Vinyl esters of carboxylic acids having 1 to 20 C atoms are for example vinyl laurate, vinyl stearate, vinyl propionate, Versatic acid vinyl esters, and vinyl acetate.

Suitable vinyl aromatic compounds include vinyltoluene o- and p-methylstyrene, o-butylstyrene, 4-n-butylstyrene, 4-n-decylstyrene, and, preferably styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Vinyl ethers include for example vinyl methyl ether or vinyl isobutyl ether. Preferred vinyl ethers are those of alcohols comprising 1 to 4 C atoms.

As hydrocarbons having 2 to 8 C atoms and one or two olefinic double bonds mention may be made of butadiene, isoprene, and chloroprene, ethylene or propylene. Polymers or copolymers obtained from butadiene or isoprene can also be hydrogenated subsequently.

Preferred principal monomers are vinyl esters, preferably vinyl acetate, not least in combination with ethylene (vinyl acetate/ethylene copolymers for short), butadiene, not least in combination with styrene (butadiene/styrene copolymers for short), and the $C_1$ to $C_{10}$ alkyl acrylates and methacrylates, especially $C_1$ to $C_8$ alkyl acrylates and methacrylates (polyacrylates for short), polyacrylates being particularly preferred in each case.

Very particular preference is given to methyl acrylate, ethyl acrylate, n-butyl acrylate, n-hexyl acrylate, octyl acrylate, and 2-ethylhexyl acrylate, and also to mixtures of these monomers.

Besides the principal monomers the polymer may comprise further monomers, examples being monomers containing carboxylic acid, sulfonic acid or phosphonic acid groups. Carboxylic acid groups are preferred. Mention may be made for example of acrylic acid, methacrylic acid, itaconic acid, maleic acid or fumaric acid.

Further monomers are also, for example, hydroxyl-comprising monomers, especially $C_1$-$C_{10}$ hydroxyalkyl(meth)acrylates, (meth)acrylamide, and monomers comprising ureido groups, such as ureido (meth)acrylates.

Further monomers that may be mentioned are, moreover, phenyloxyethyl glycol mono(meth)acrylate, glycidyl acrylate, glycidyl methacrylate, and amino (meth)acrylates such as 2-aminoethyl(meth)acrylate.

Monomers which apart from the double bond also carry further functional groups, isocyanate-, amino-, hydroxyl-, amide- or glycidyl- for example, may improve, for example, the adhesion to substrates. Those suitable include, in particular, cyclic lactams such as N-vinylpyrrolidone or N-vinylcaprolactam.

Also suitable are polymers whose adhesive properties can be adjusted by means of photochemical crosslinking, as for example by irradiation with electron beams or UV light (acResin® from BASF).

The polymer is photochemically crosslinkable if, for example, hydrogen protons can be abstracted from the polymer's main chain photochemically, not least using a photoinitiator, or by means of electron beams, thus producing a free radical which is able to enter into further chemical reactions.

The adhesive may for this purpose comprise a photoinitiator.

The photoinitiator may comprise, for example, what are called α-splitters, which are photoinitiators in which a chemical bond is cleaved to produce 2 free radicals which initiate the further crosslinking or polymerization reactions.

Mention may be made, for example, of acylphosphine oxides (Lucirin® products from BASF), hydroxyalkylphenones (e.g., Irgacure® 184), benzoin derivatives, benzyl derivatives, and dialkyloxyacetophenones.

The compounds in question may in particular be what are called H-abstractors, which detach a hydrogen atom from the polymer chain; these are, for example, photoinitiators containing a carbonyl group. This carbonyl group is inserted into a C—H bond to form a C—C—O—H moiety.

Mention may be made here in particular of acetophenone, benzophenone and the derivatives thereof.

Both classes of photoinitiators can be used alone or else in a mixture. With preference the photoinitiator comprises H-abstractors.

The photoinitiator, or at least one of the photoinitiators if a mixture is used, can be attached to the adhesive polymer.

Particular preference is given to a photoinitiator which is incorporated into the polymer chain by means of free-radical copolymerization. For this purpose the photoinitiator preferably comprises an acrylic or methacrylic group.

Suitable copolymerizable photoinitiators are acetophenone derivatives or benzophenone derivatives which comprise at least one, preferably one, ethylenically unsaturated group. The ethylenically unsaturated group is preferably an acrylic group or methacrylic group.

Photochemical crosslinking and/or the accompanying use of photoinitiators is not necessary in the context of the present invention, and such crosslinking or accompanying use may therefore be foregone.

The glass transition temperature (Tg) of the polymers A and B is situated preferably in each case in the range from −75 to +50° C.

The glass transition temperature is calculated in accordance with the Fox equation from the glass transition temperature of the homopolymers of the monomers present in the copolymer and from their weight fraction:

$$1/Tg = xA/TgA + xB/TgB + xC/TgC +$$

Tg: calculated glass transition temperature of the copolymer
TgA: glass transition temperature of the homopolymer of monomer A
TgB, Tg correspondingly for monomers B, C, etc.
xA: mass of monomer A/total mass of copolymer,
xB, xC correspondingly for monomers B, C etc.

The Fox equation is given in standard text books, including for example the Handbook of Polymer Science and Technology, New York, 1989 by Marcel Dekker, Inc.

The glass transition temperature of the two polymers A and B differs preferably by at least 10° C., more preferably by at least 12° C., and very preferably by at least 15° C. (Tg determined in accordance with the Fox equation).

The Tg of polymer A is situated preferably in the range from −75 to 0° C., more preferably from −60 to −10° C., and very preferably from −60 to −30° C.; the Tg of polymer B is situated preferably in the range from −60 to +50° C., more preferably in the range from −45 to +40° C., and with very particular preference from −30 to +40° C.

In particular, in addition, one polymer, A or B, is more hydrophilic than the other. In particular the more hydrophilic polymer comprises hydrophilic monomers. Suitable hydrophilic monomers include, for example, monomers having only short hydrocarbon groups with not more than 3 C atoms, particular preference being given to methyl acrylate or methyl methacrylate, or monomers containing hydrophilic functional groups, such as hydroxyl, amino, nitrile, acid or acid-anhydride groups, or mixtures thereof, for example.

In one preferred embodiment the hydrophilicity derives from the presence of hydrophilic functional groups. The amount of hydrophilic functional groups in the more hydrophilic polymer is therefore preferably 0.001 to 1.0 mol/100 g of polymer, more preferably 0.001 to 0.5, and very preferably 0.01 to 0.5 mol/100 g of polymer and in particular 0.05 to 0.5 mol/100 g of polymer.

If the less hydrophilic polymer also contains hydrophilic groups of this kind, the amount of such groups is generally less than half, with particular preference less than a quarter, of the amount of these groups in the more hydrophilic polymer.

In another preferred embodiment the hydrophilicity derives from the presence of hydrophilic monomers without functional groups (see above, methyl acylate or methyl methacrylate for example). Preferably, therefore, in this embodiment the more hydrophilic polymer contains these monomers, whereas the less hydrophilic monomer has not more than half thereof, with particular preference not more than a quarter thereof, and with very particular preference does not comprise these monomers at all.

Preparation Form and Preparation of the Polymers

An essential feature of the invention is that at least one of the polymers, A or B, is present in the form of an aqueous polymer dispersion and is applied and filmed as such.

The other polymer, A or B, can be present in the form of a solution in a suitable solvent, preferably water, water-miscible solvents or mixtures thereof; in the form of a 100% system, i.e., substantially water-free and solvent-free (residual water and/or solvent content preferably less than 5%, in particular less than 2%, or less than 1% by weight); or else in the form of an aqueous polymer dispersion.

The aqueous polymer dispersion of the polymer A or B can be obtained by means for example of emulsion polymerization or by dispersing the polymer A or B in water (secondary dispersion).

The aqueous polymer dispersion of the polymer A or B is obtained preferably by emulsion polymerization and is therefore an emulsion polymer.

With particular preference both polymers A and B are in the form of an aqueous dispersion, and in particular both polymers A and B are obtained by emulsion polymerization.

Prior to filming, the polymers A and B, or the dispersions or solutions comprising A and B, respectively, are preferably mixed, so that the polymers A and B are in homogeneous distribution in the resulting mixture.

In one particularly preferred embodiment an aqueous polymer dispersion is filmed whose dispersed polymer particles have domains of polymer A and of polymer B (structured polymer particles for short).

Structured polymer particles of this kind are obtainable by multistage emulsion polymerization; in that case, of course, there is no need for mixing.

Processes for preparing the polymers are common knowledge.

The polymers can be prepared by copolymerizing the monomers using the customary polymerization initiators and also, if appropriate, regulators, polymerization being carried out at the customary temperatures in bulk, in emulsion, as for example in water or liquid hydrocarbons, or in solution. The polymerization, bulk polymerization for example, can also be carried out in an extruder.

Preference is given to emulsion polymerization.

In the case of emulsion polymerization, ionic and/or nonionic emulsifiers and/or protective colloids, or stabilizers, are used as surface-active compounds.

A detailed description of suitable protective colloids is found in Houben-Weyl, Methoden der organischen Chemie, Volume XIV/1, Makromolekulare Stoffe [Macromolecular compounds], Georg-Thieme-Verlag, Stuttgart, 1961, pp. 411 to 420. Suitable protective colloids include for example amphiphilic polymers, i.e., polymers having hydrophobic and hydrophilic groups. These may be natural polymers, such as starch, or synthetic polymers, such as hydrophilically modified polyolefins, acrylic acid/ethylene copolymers for example. Suitable emulsifiers include anionic, cationic, and nonionic emulsifiers. As accompanying surface-active substances it is preferred to use exclusively emulsifiers, whose molecular weights, in contradistinction to those of the protective colloids, are typically below 2000 g/mol. Where mixtures of surface-active substances are used the individual components must of course be compatible with one another, something which in case of doubt can be checked by means of a few preliminary tests. Preference is given to using anionic and nonionic emulsifiers as surface-active substances. Common accompanying emulsifiers are, for example, ethoxylated fatty alcohols (EO degree: 3 to 50, alkyl radical: $C_8$ to $C_{36}$), ethoxylated mono-, di-, and trialkylphenols (EO degree: 3 to 50, alkyl radical: $C_4$ to $C_9$), alkali metal salts of dialkyl esters of sulfosuccinic acid, and also alkali metal salts and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$), and of alkylarylsulfonic acids (alkyl radical: $C_9$ to $C_{18}$).

Further suitable emulsifiers are compounds of the general formula II

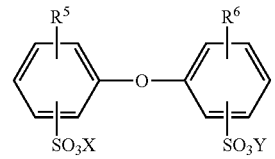

(II)

in which $R^5$ and $R^6$ are hydrogen or $C_4$ to $C_{14}$ alkyl and are not simultaneously hydrogen, and X and Y can be alkali metal ions and/or ammonium ions. Preferably $R^5$ and $R^6$ are linear or branched alkyl radicals having 6 to 18 C atoms or hydrogen and in particular have 6, 12, and 16 C atoms, $R^5$ and $R^6$ not both simultaneously being hydrogen. X and Y are preferably sodium, potassium or ammonium ions, with sodium being particularly preferred. Particularly advantageous compounds II are those in which X and Y are sodium, $R^5$ is a branched alkyl radical having 12 C atoms, and $R^6$ is hydrogen or $R^5$. Use is made frequently of technical mixtures which have a fraction of 50% to 90% by weight of the monoalkylated product, an example being Dowfax® 2A1 (trademark of the Dow Chemical Company).

Suitable emulsifiers are also found in Houben-Weyl, Methoden der organischen Chemie, Volume 14/1, Makromolekulare Stoffe, Georg Thieme Verlag, Stuttgart, 1961, pages 192 to 208.

Examples of emulsifier trade names include Dowfax® 2A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol VSL, and Emulphor NPS 25.

Preference for the present invention is given to ionic emulsifiers or protective colloids. With particular preference they are ionic emulsifiers, especially salts and acids, such as carboxylic acids, sulfonic acids, and sulfates, sulfonates or carboxylates. In one particularly preferred embodiment protective colloids are used, preferably in amounts of 0 to 30 parts by weight, more preferably of 10 to 20 parts by weight, per 100 parts by weight of the monomers to be polymerized.

The surface-active substances in total (i.e., emulsifiers and protective colloids) are used preferably in amounts of 0.1 to 35 parts by weight, preferably 0.2 to 30 parts by weight, based on 100 parts by weight of the monomers to be polymerized.

Protective colloids are preferably introduced as an initial charge for the emulsion polymerization, whereas emulsifiers can also be supplied, together if appropriate with the monomers, in the course of the polymerization.

Water-soluble initiators for the emulsion polymerization are, for example, ammonium salts and alkali metal salts of peroxydisulfuric acid, sodium peroxodisulfate for example, hydrogen peroxide or organic peroxides, tert-butyl hydroperoxide for example.

Also suitable are what are known as reduction-oxidation (redox) initiator systems.

The redox initiator systems are composed of at least one, usually inorganic, reducing agent and an organic or inorganic oxidizing agent.

The oxidizing component comprises, for example, the initiators already stated above for the emulsion polymerization.

The reducing components comprise, for example, alkali metal salts of sulfurous acid, such as sodium sulfite, sodium hydrogen sulfite, alkali metal salts of disulfurous acids such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used together with soluble metal compounds whose metallic component is able to exist in a plurality of valence states.

Typical redox initiator systems are, for example, ascorbic acid/iron(II) sulfate/sodium peroxydisulfate, tert-butyl hydroperoxide/sodium disulfite, tert-butyl hydroperoxide/Na hydroxymethanesulfinic acid. The individual components, the reducing component for example, may also be mixtures, an example being a mixture of the sodium salt of hydroxymethanesulfinic acid with sodium disulfite.

The stated compounds are used mostly in the form of aqueous solutions, the lower concentration being determined by the amount of water that is acceptable in the dispersion and the upper concentration by the solubility of the respective compound in water. In general the concentration is 0.1 to 30% by weight, preferably 0.5 to 20% by weight, more preferably 1.0 to 10% by weight, based on the solution.

The amount of initiators is generally 0.1 to 10% by weight, preferably 0.5 to 5% by weight, based on the monomers to be polymerized. It is also possible for two or more different initiators to be used in the emulsion polymerization.

In the polymerization it is possible to employ regulators, in amounts for example of 0 to 0.8 part by weight, based on 100 parts by weight of the monomers to be polymerized, and these regulators lower the molar mass. Suitability is possessed for example by compounds containing a thiol group such as tert-butyl mercaptan, thioglycolic acid ethyl ester, mercaptoethanol, mercaptopropyltrimethoxysilane or tert-dodecyl mercaptan.

The emulsion polymerization takes place in general at 30 to 130, preferably 50 to 90° C. The polymerization medium may be composed either of water alone or of mixtures of water and water-miscible liquids such as methanol. Preferably just water is used. The emulsion polymerization can be conducted either as a batch operation or in the form of a feed process, including stages or gradient procedures. Preference is given to the feed process, for which a portion of the polymerization batch is introduced as an initial charge, heated to the polymerization temperature, and partially polymerized, after which the remainder of the polymerization batch, typically by way of two or more spatially separate feed streams, of which one or more comprise the monomers in neat or in emulsified form, is supplied continuously or else in stages.

Polymers A and B are present, as described above, in the form of structured polymer particles (with domains of A and B) in aqueous dispersion. Particles of this kind are obtained in particular by means of multistage emulsion polymerization.

The polymerization takes place preferably in two sequential stages, the individual stages differing in terms of the monomer composition (in accordance with polymer A and B, respectively).

In the multistage polymerization the monomers of the individual stages are polymerized during or immediately after the addition of the monomers to the polymerization mixture. This means that, during or immediately after the addition of the monomers, the conditions are such that the added monomers polymerize. For this purpose there ought in particular to be an initiator present and the temperature ought in particular to be sufficiently high. With particular preference initiator is added at the same time as the monomer is added. If the monomers of one stage are supplied continuously over a relatively long time, then initiator is preferably supplied for at least the same time. Since the monomers supplied polymerize during or immediately after addition, the swelling polymerization described in, for example, EP-A 1 420 055 does not occur.

In order to remove the residual monomers it is also common to add initiator after the end of the emulsion polymerization proper.

The emulsion polymerization produces aqueous dispersions of the polymer A or B or of the structured polymer particles, respectively, which have solids contents of 15% to 75% by weight, preferably of 40% to 75% by weight.

The average particle diameter (particle size) of the dispersed polymer particles is preferably less than 400 nm, in particular less than 300 nm, and is generally greater than 50 nm, in particular greater than 80 nm, more preferably greater than 100 nm. With particular preference the average particle size is situated between 140 and 250 nm.

By average particle diameter/particle size is meant here the d50 value of the particle-size distribution; in other words, 50% by weight of the total mass of all particles have a smaller particle diameter than the d50 value. The particle-size distribution can be determined in a known way using the analytical ultracentrifuge (W. Mäschtle, Makromolekulare Chemie 185 (1984), page 1025-1039).

The pH of the polymer dispersion is adjusted preferably to a pH greater than 2, in particular to a pH between 4 and 8.

Further Constituents of the Polymer Phase A and B and General Remarks Relating to Polymer Phases A and B Besides the polymer A, and besides the polymer B, respectively, the polymer phase A and the polymer phase B may comprise further constituents.

Mention may be made, for example, of adjuvants such as fillers, dyes, flow-control agents, thickeners, and plasticizing resins (tackifiers).

Tackifiers are, for example, natural resins, such as rosins and their derivatives formed by disproportionation or isomerization, polymerization, dimerization, hydrogenation. They may be present in their salt form (with monovalent or polyvalent counterions (cations), for example) or, preferably, in their esterified form. Alcohols used for the esterification may be monohydric or polyhydric. Examples are methanol, ethanediol, diethylene glycol, triethylene glycol, 1,2,3-propanetriol, pentaerythritol.

Preferred tackifiers are natural or chemically modified rosins. Rosins are composed predominantly of abietic acid or abietic-acid derivatives.

The polymer phases A and B, respectively, are composed of more than 50% by weight, more preferably of more than 70% by weight, and with particular preference of more than 90% by weight of the polymer A or B respectively.

If a tackifier is used it is preferably situated in the polymer phase comprising the polymer having the lower Tg.

The further constituents may be added to the preparations (dispersions, solutions) of the polymers A or B or of the structured polymer particles.

The fraction of the polymer phases A and B in the adhesive film as a whole may be varied across large ranges. Preferably the fraction of the polymer phase A and B is in each case 5% to 95% by weight, more preferably 10% to 90% by weight, very preferably 20% to 80% by weight, and, in one particular embodiment 30% to 70% by weight or in particular 40% to 60% by weight.

Production of the Adhesive Film with Polymer Phases A and B

The polymer phases A and B form by filming of the preparations which comprise the polymers A or B or the structured polymer particles and, if appropriate, the further adjuvants.

The preparation may be applied by customary methods, as for example by rolling, knifecoating, spreading, etc., onto backings, examples being paper or polymer films, composed preferably of polyethylene, polypropylene, which may have been biaxially or monoaxially oriented, polyethylene terephthalate, polyvinyl chloride, polystyrene, polyamide or metal.

Water can be removed preferably by drying at 50 to 150° C. Before or after the adhesive has been applied, the backings may be slit to form adhesive tapes, labels or sheets. For subsequent use it is possible to line the PSA-coated side of the substrate with a release paper—for example, with a siliconized paper.

Use

The adhesive film is preferably an adhesive film which is permanently tacky at room temperature—that is, a pressure-sensitive adhesive film.

The adhesive film, or pressure-sensitive adhesive film, of the invention is suitable in particular for self-adhesive articles. The self-adhesive articles comprise in particular a backing, preferably those specified above, and the preparation which forms the polymer phases A and B, this preparation having been applied to the backing by coating.

The adhesive film, or pressure-sensitive adhesive film, possesses effective adhesion (tackiness) in association with effective cohesion (internal strength in the adhesive layer).

The adhesive film preferably has a peel strength at 23° C. (as a measure of the adhesion) of at least 1 N/2.5 cm, more preferably of at least 2 N/2.5 cm, very preferably of at least 4 N/2.5 cm, in accordance with the method of measurement below.

The adhesive film preferably has a quickstick value at 23° C. (as a measure of the adhesion) of at least 2 N/2.5 cm, more preferably of at least 3 N/2.5 cm, very preferably of at least 4 N/2.5 cm, in accordance with the method of measurement below.

The shear strength, as a measure of the cohesion, is preferably greater than 1 hour, more preferably greater than 5 hours, very preferably greater than 10 hours, and in particular greater than 20 hours, in accordance with the method of measurement below.

Method of Measurement:

The polymer dispersions were coated onto polyethylene terephthalate at a rate of 25 g/m$^2$ and dried at 90° C. for 3 minutes. Thereafter the laminate was lined with silicone paper. Subsequently the peel strength, the quickstick, and the shear strength were determined.

The PSA-coated backing was slit to form test strips 25 mm wide. For the determination of the shear strength the test strips were adhered with a bonded area of 6.25 cm$^2$ to steel, rolled on once using a roller weighing 1 kg, stored for 10 minutes (under standard conditions, 50% relative humidity, 1 bar, 23° C.), and subsequently loaded in suspension with a 1 kg weight (under standard conditions). The measure of the shear strength was the time, in hours, until the weight fell off; in each case the average was calculated from 3 measurements.

To determine the peel strength, a 2.5 cm wide test strip was adhered to a steel test element and rolled on once using a roller weighing 1 kg. One end of the strip was then clamped into the upper jaws of a stress/strain testing apparatus. The adhesive strip was pulled from the test surface at 300 mm/min at an angle of 180°, i.e., the adhesive strip was bent over and pulled off parallel to the metal test plate, and the force required to accomplish this was measured. The measure of the peel strength was the force, in N/2.5 cm, which resulted as the average value from three measurements.

The peel strength was determined 1 minute after bonding.

For the determination of the loop test (loop tack, quickstick) a loop was formed from the test strips and the adhesive-coated side was brought into contact with a steel surface. Thereafter a measurement was made of the maximum force (peel speed 300 mm/min) required to peel the loop from the steel surface.

The self-adhesive articles of the invention have very good adhesive properties, in particular effective adhesion to the substrates and a high level of cohesion (internal strength in the adhesive layer).

EXAMPLES

Comparative Example 1

In a 2 liter polymerization reactor with anchor stirrer and heating/cooling means a mixture of 266 g of deionized water and 14.55 g of a 35% by weight aqueous polymer latex (prepared by free-radically initiated emulsion polymerization of styrene) having a weight-average particle diameter Dw50 of 30 nm was heated at 85° C. under a nitrogen atmosphere. Added to this initial charge at the aforementioned temperature were 12.0 g of a 7 percent strength by weight aqueous solution of sodium peroxodisulfate. After 5 minutes feed stream 1 and feed stream 2 are metered in over the course of 3 hours. Polymerization then takes place for 30 minutes and, finally, 24 g of a 10% strength solution of tert-butyl peroxide in water and 29.3 g of an acetone bisulfite solution in water are metered in simultaneously with stirring over the course of one hour. The system is allowed to cool to room temperature and the dispersion is partly neutralized with 9.8 g of 25% strength ammonia. The dispersion has a solids content of 49-52%.
Feed Stream 1:
765 g of deionized water
37.5 g of a 32% strength aqueous solution of the sodium salt of the sulfuric monoester of dodecanol ethoxylated with 30 ethylene oxide units (Disponil FES 77)
5.3 g of a 45% strength solution of the sodium salt of the diphenyl ether derivatized with a C12-C14 alkyl radical and with two sulfonyl radicals (Dowfax 2A1)
36 g of acrylic acid
102 g of acrylonitrile
1062 g of 2-ethylhexyl acrylate
Feed Stream 2:
108 g of a 7 percent strength by weight aqueous solution of sodium peroxodisulfate Comparative Example 2

In a 2 liter polymerization reactor with anchor stirrer and heating/cooling means a mixture of 266 g of deionized water and 14.55 g of a 33% by weight aqueous polymer latex (prepared by free-radically initiated emulsion polymerization of styrene) having a weight-average particle diameter Dw50 of 30 nm was heated at 85° C. under a nitrogen atmosphere. Added to this initial charge at the aforementioned temperature were 12.0 g of a 7 percent strength by weight aqueous solution of sodium peroxodisulfate. After 5 minutes feed stream 1 and feed stream 2 are metered in over the course of 3 hours. Polymerization then takes place for 30 minutes and, finally, 24 g of a 10% strength solution of tert-butyl peroxide in water and 29.3 g of an acetone bisulfite solution in water are metered in simultaneously with stirring over the course of one hour. The system is allowed to cool to room temperature and the dispersion is partly neutralized with 9.8 g of 25% strength ammonia. The dispersion has a solids content of 49-52%.
Feed Stream 1:
765 g of deionized water
37.5 g of a 32% strength aqueous solution of the sodium salt of the sulfuric monoester of dodecanol ethoxylated with 30 ethylene oxide units (Disponil FES 77)
5.3 g of a 45% strength solution of the sodium salt of the diphenyl ether derivatized with a C12-C14 alkyl radical and with two sulfonyl radicals (Dowfax 2A1)
9 g of acrylic acid
1107 g of 2-ethylhexyl acrylate
60 g of vinyl acetate
24 g of styrene
Feed Stream 2:
108 g of a 7 percent strength by weight aqueous solution of sodium peroxodisulfate Inventive Example 1

A 50:50 mixture of the dispersions of Comparative Examples 1 and 2.

Inventive Example 2

In a 2 liter polymerization reactor with anchor stirrer and heating/cooling means a mixture of 266 g of deionized water and 14.55 g of a 33% by weight aqueous polymer latex (prepared by free-radically initiated emulsion polymerization of styrene) having a weight-average particle diameter Dw50 of 30 nm was heated at 85° C. under a nitrogen atmosphere. Added to this initial charge at the aforementioned temperature were 12.0 g of a 7 percent strength by weight aqueous solution of sodium peroxodisulfate. After 5 minutes feed stream 1 and feed stream 2 are commenced. Feed stream 1 is metered in over the course of 1.5 hours and feed stream 2 over the course of 3 hours. Directly after the end of feed stream 1, feed stream 3 is commenced and is metered in over 1.5 hours. Polymerization then takes place for 30 minutes and, finally, 24 g of a 10% strength solution of tert-butyl peroxide in water and 29.3 g of an acetone bisulfite solution in water are metered in simultaneously with stirring over the course of one hour. The system is allowed to cool to room temperature and the dispersion is partly neutralized with 9.8 g of 25% strength ammonia. The dispersion has a solids content of 49-52%.
Feed Stream 1:
382 g of deionized water
18.75 g of a 32% strength aqueous solution of the sodium salt of the sulfuric monoester of dodecanol ethoxylated with 30 ethylene oxide units (Disponil FES 77)
2.67 g of a 45% strength solution of the sodium salt of the diphenyl ether derivatized with a C12-C14 alkyl radical and with two sulfonyl radicals (Dowfax 2A1)
4.5 g of acrylic acid
553.5 g of 2-ethylhexyl acrylate
30 g of vinyl acetate
12 g of styrene
Feed Stream 2:
108 g of a 7 percent strength by weight aqueous solution of sodium peroxodisulfate
Feed Stream 3:
382 g of deionized water
18.75 g of a 32% strength aqueous solution of the sodium salt of the sulfuric monoester of dodecanol ethoxylated with 30 ethylene oxide units (Disponil FES 77)
2.67 g of a 45% strength solution of the sodium salt of the diphenyl ether derivatized with a C12-C14 alkyl radical and with two sulfonyl radicals (Dowfax 2A1)
18 g of acrylic acid
51 g of acrylonitrile
531 g of 2-ethylhexyl acrylate
Performance Testing The testing was carried out in accordance with the measurement methods described above

TABLE

| Polymer | Shear strength (hours) | Quickstick (N/2.5 cm) | Peel strength (N/2.5 cm) |
|---------|------------------------|-----------------------|--------------------------|
| C1 | more than 100 | 3.1 | 4.1 |
| C2 | 4.4 | 10.8 | 9.6 |
| I1 | 11.4 | 4.5 | 2.7 |
| I2 | more than 100 | 5.6 | 7.3 |

To determine the structure of the polymer phases A and B, the dried adhesive film was frozen and a cross section was produced by means of ultracryomicrotomy. The cross sections were then warmed to room temperature and immediately imaged by means of atomic force microscopy (in Tapping® mode). The polymer phases can be differentiated in the "phase" measurement channel (often also referred to as material contrast). Both the imaging parameters and the Z scale (i.e., the color depiction) are to be chosen so that a maximum contrast is visible between the polymer phases.

Figure 2:
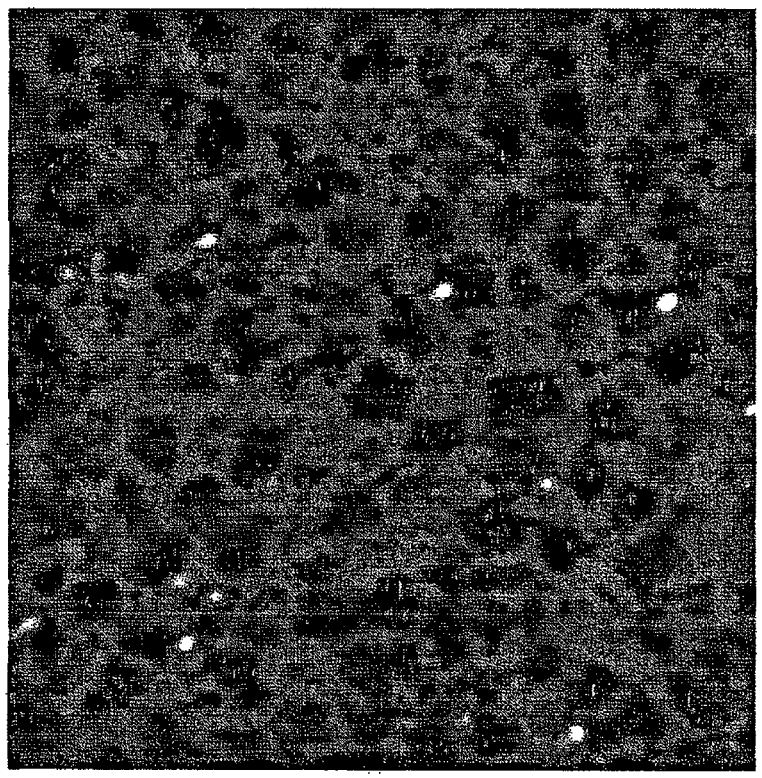
FIG. 2 shows atomic force microscopy images for polymer dispersions C1 and C2.
Figure 2:
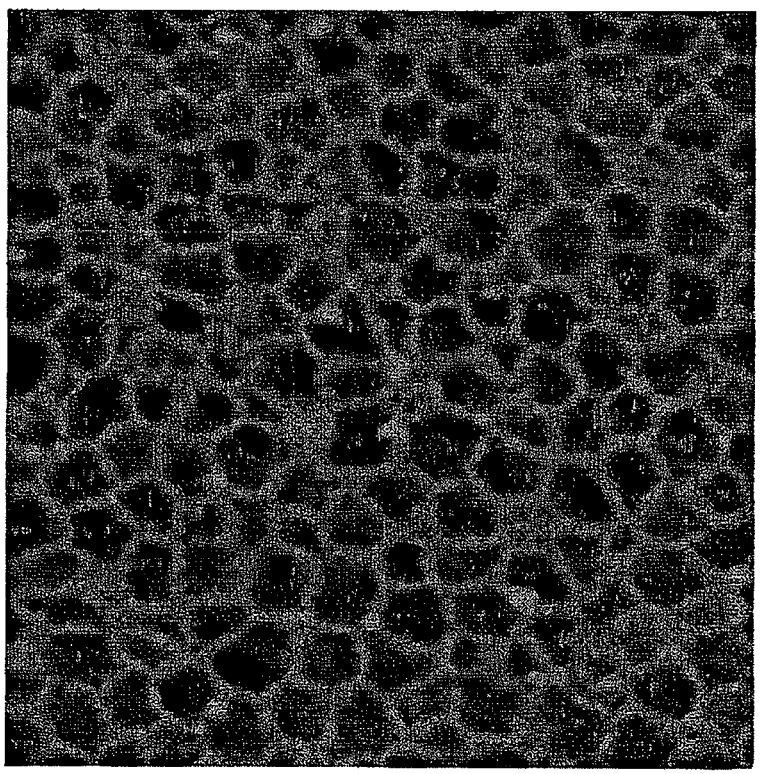

The polymer dispersions C1, C2, I1 and I2 were prepared and measured in this way. FIGS. 1-2 show in each case the "phase" measurement channel. The atomic force microscopy images shown have an edge length of 2 μm times 2 μm. In Inventive Examples I1 and I2 the bicontinuous structure of both polymer phases is apparent, whereas in Comparative Examples C2 and C1 the dark phase is in each case in disperse form.

The invention claimed is:

1. A process for producing an adhesive film, wherein the process comprises filming a polymer or polymer mixture A and a polymer or polymer mixture B to obtain the adhesive film, with the proviso that at least one of the polymer or polymer mixture A and the polymer or polymer mixture B is filmed initially in the form of an aqueous polymer dispersion comprising dispersed polymer particles having an average particle diameter of 100-400 nm, wherein the adhesive film obtained from said filming comprises at least two continuous polymer phases of the polymer or polymer mixture A and the polymer or polymer mixture B.

2. The process according to claim 1, wherein the process further comprises, prior to said filming, providing a homogenous mixture comprising the polymer or polymer mixture A and the polymer or polymer mixture B.

3. The process according to claim 1, with the proviso that both the polymer or polymer mixture A and the polymer or polymer mixture B are filmed in the form of the aqueous polymer dispersion.

4. The process according to claim 1, wherein the aqueous polymer dispersion is obtained by emulsion polymerization of either the polymer or polymer mixture A or the polymer or polymer mixture B.

5. The process according to claim 1, wherein the aqueous polymer dispersion is obtained by emulsion polymerization of both the polymer or polymer mixture A and the polymer or polymer mixture B.

6. The process according to claim 1, wherein the glass transition temperature $T_g$ of polymer A and polymer B differ by at least 15° C.

7. The process according to claim 1, wherein one of polymers A or B is more hydrophilic than the other.

8. The process according to claim 1, wherein the dispersed polymer particles have an average particle diameter of 100-300 nm.

9. The process according to claim 1, wherein the dispersed polymer particles have an average particle diameter of 140-250 nm.

* * * * *